US005594096A

United States Patent [19]
Carey et al.

[11] Patent Number: 5,594,096
[45] Date of Patent: Jan. 14, 1997

[54] POLYMERIC DITHIOCARBAMIC ACID SALT COMPOSITIONS AND METHODS OF USE

[75] Inventors: William S. Carey, Ridley Park; Ellen M. Meyer, Doylestown; Jeffrey H. Peltier, King of Prussia, all of Pa.

[73] Assignee: BetzDearborn Inc., Trevose, Pa.

[21] Appl. No.: 609,587

[22] Filed: Mar. 1, 1996

Related U.S. Application Data

[62] Division of Ser. No. 390,332, Feb. 17, 1995, Pat. No. 5,523,002.

[51] Int. Cl.$^6$ ............................. C08G 75/14; C02F 1/54
[52] U.S. Cl. ...................... 528/387; 210/723; 210/728; 210/735; 210/912; 252/175; 252/394; 528/390
[58] Field of Search ..................... 210/723, 728, 210/735, 912; 252/175, 394; 528/387, 390

[56] References Cited

U.S. PATENT DOCUMENTS

| | | | |
|---|---|---|---|
| 2,326,643 | 8/1943 | Hester | 558/237 |
| 2,609,389 | 9/1952 | Flenner | 562/28 |
| 2,693,485 | 11/1954 | Gobeil | 562/27 |
| 3,956,121 | 8/1976 | Haschke et al. | 210/725 |
| 4,578,195 | 3/1986 | Moore et al. | 210/911 |
| 4,612,125 | 9/1986 | Elfine | 210/912 |
| 4,670,160 | 6/1987 | Moriya et al. | 210/728 |
| 4,670,180 | 6/1987 | Moriya et al. | 252/180 |
| 4,689,177 | 9/1987 | Thompson et al. | 252/344 |
| 4,731,187 | 3/1988 | Moriya et al. | 210/719 |
| 4,758,353 | 7/1988 | Spence | 210/725 |
| 4,826,625 | 5/1989 | Thompson et al. | 252/344 |
| 4,855,060 | 8/1989 | Durham et al. | 210/708 |
| 4,864,075 | 9/1989 | Thompson et al. | 558/237 |
| 4,956,099 | 9/1990 | Thompson et al. | 210/764 |
| 5,006,274 | 4/1991 | Durham et al. | 252/180 |
| 5,013,451 | 5/1991 | Thompson et al. | 210/708 |
| 5,019,274 | 5/1991 | Thompson et al. | 210/729 |
| 5,026,483 | 6/1991 | Thompson et al. | 210/708 |
| 5,089,227 | 2/1992 | Thompson et al. | 422/16 |
| 5,089,619 | 2/1992 | Thompson et al. | 544/357 |

(List continued on next page.)

OTHER PUBLICATIONS

"Synthesis and Photochemical Reactions of Polymers Containing Dithiocarbamate and Xanthate Groups and Their Model Compounds", M. Okawara, et al., *Bull. Tokyo Inst. Technol.*, No. 78, 1–16, (1966), CAS (68: 78, 731n).

"Poly[n–(dithiocarboxylate)iminoethylenehydrogen–iminoethylene] A Novel Metal–Complexing Polymer", J. H. Barnes et al., *Die Makromolekulare Chemie*, 177, 307–310 (1976).

"Synthesis of Dithiocarbamates From Linear Poly(iminoethylene) and Some Model Compounds", Ivin et al., *Makromol. Chem.*, 179, 591–599 (1978).

"Heavy Metal Removal from Wastewater", Miyoshi Oil and Fat Co., Ltd., 13 Jun. 1981, 7 pp., CAS (98:185066r).

"Metal Scavengers for Wastewater Treatment", Moriya et al., 20 Dec. 1989, 12 pp., CAS (115:119534k).

"Metal–Capturing Agents and Capture of the Metals", Moriya et al., 30 Jun. 1992, 10 pp. CAS (121:116837z).

"Waste Water–Treating Agents", Tomita, et al., 12 Jul. 1973, 5 pp., CAS (83:15187y).

Contemporary Polymer Chemistry, H. R. Alcock and F. W. Lampe, Chap. 11, pp. 245–267, 1981.

Copending patent application Ser. No. 08/551, 589, filed Nov. 1,1995 titled "Polymeric Dithiocarbamic Acid Salt Compositions and Methods of Use" by Carey et al.

*Primary Examiner*—Samuel A. Acquah
*Attorney, Agent, or Firm*—Alexander D. Ricci; Matthew W. Smith

[57] ABSTRACT

A contaminant precipitating composition and method are disclosed. The composition comprises a water soluble branched polymeric composition effective for the purpose of precipitating contaminants from an aqueous solution. The method comprises adding an amount of the composition, effective for the purpose, to the aqueous solution so as to complex, precipitate and remove contaminants from the aqueous solution.

6 Claims, 1 Drawing Sheet

U.S. PATENT DOCUMENTS

| | | | |
|---|---|---|---|
| 5,152,927 | 10/1992 | Rivers | 252/344 |
| 5,164,095 | 11/1992 | Sparapany et al. | 210/735 |
| 5,205,939 | 4/1993 | Syrinek | 210/912 |
| 5,247,087 | 9/1993 | Rivers | 210/728 |
| 5,302,296 | 4/1994 | Evain et al. | 210/728 |
| 5,347,071 | 9/1994 | Moriya et al. | 210/728 |
| 5,372,726 | 12/1994 | Straten | 210/728 |
| 5,387,365 | 2/1995 | Moriya et al. | 252/180 |
| 5,500,133 | 3/1996 | Carey et al. | 210/729 |

POLYMERIC DITHIOCARBAMIC ACID SALT COMPOSITIONS AND METHODS OF USE

This is a divisional of application Ser. No. 08/390,332 filed Feb. 17, 1995 now U.S. Pat. No. 5,523,002.

FIELD OF THE INVENTION

The present invention relates to water-soluble, polydithiocarbamic acid salts. More particularly, the present invention relates to the use of polydithiocarbamic acid salts to precipitate contaminants from aqueous solutions.

BACKGROUND OF THE INVENTION

Industry has come under strict regulations to limit the level of contaminants in discharged wastewater. Particularly restrictive discharge regulations have been adopted for contaminants harmful to humans and aquatic organisms such as heavy metals; for example, copper, lead, zinc, cadmium and nickel, and certain non-metals such as arsenic and selenium. Consequently, a number of processes have been proposed to reduced the heavy metal content of wastewater to meet increasingly stringent discharge limits.

One common practice is to precipitate the bulk of the heavy metal contaminant as its metal hydroxide. Metal ions such as copper and lead are easily precipitated in this way, but the minimum concentration that can be obtained is limited by the finite solubility of the hydroxide complexes. The resulting effluent from the hydroxide precipitation may be treated with a metal scavenging agent to remove any trace metal contaminants to meet discharge regulations. These agents may be precipitants, adsorbents, or metal specific ion exchange resins. The metal scavenger precipitants may also be effective when added in the same step as the hydroxide precipitation. Typical compounds utilized as precipitating scavenging agents include sulfides, (thio)carbonates, alkyl dithiocarbamates, mercaptans, and modified natural products.

Non-metals such as selenium and arsenic are not easily precipitated with hydroxide. These ions are typically co-precipitated with metal salts such as ferric sulfate. Traditional precipitant metal scavenging agents are usually ineffective in removing these ions.

The prior art scavenging agents have other limitations. The metal thiocarbonates, sulfides, mercaptans, and thiocarbamates form fine flocs which are not conducive to settling and typically require the use of a flocculation agent and/or filtration to achieve efficient removal. Prior art polydithiocarbamates are characterized as having limited water solubility, which limits the degree of functionalization possible. In addition, a number of the prior art scavenging agents are themselves very toxic and care must be taken to ensure that they are not present in the discharged wastewater.

There exists a need, therefore, for a less toxic scavenging agent that forms larger, faster settling floc than the prior art compounds. It is also desirable that this material be water-soluble so it can be utilized in existing clarification facilities, avoiding the need for capital investment in resin-bed apparati or other specialized equipment.

PRIOR ART

The preparation of dithiocarbamic acids by the reaction of carbon disulfide with amines is well documented. For example, U.S. Pat. Nos. 2,609,389 and 2,693,485 disclose the reaction products of lower alkylene diamines with carbon disulfide to yield the corresponding dithiocarbamic acids or their salts. In some of the art these products are referred to as polydithiocarbamates because each molecule contains more than one dithiocarbamate functionality. For the purpose of our invention, however, a polydithiocarbamate is defined as having at least fifteen distinct monomer units containing a dithiocarbamate functionality (i.e., the sum of x, y and z of Formula I is >15).

U.S. Pat. Nos. 4,855,060, 5,006,274 and 5,152,927 disclose the use of di- and trifunctional dithiocarbamate compounds as water clarification agents.

Monofunctional sodium dialkyldithiocarbamates are marketed by ALCO Chemical Corporation (AQUAMET®E, AQUAMET®M) and Vinings Industries, Inc. (VINMET® 1140) as heavy metal precipitants for wastewater treatment applications.

U.S. Pat. Nos. 4,689,177, 4,826,625, 4,864,075, 4,956,099, 5,013,451, 5,019,274, 5,026,483, 5,089,227, and 5,089,619 disclose the use of mainly difunctional and trifunctional dithiocarbamates as demulsifiers, clarification agents, biocides, corrosion and scale inhibitors, and flocculants in wastewater treatment applications. The preparation of the pentafunctional dithiocarbamate derivative of tetraethylenepentamine (TEPA) is also disclosed.

While the aforementioned organic dithiocarbamates have demonstrated the ability to precipitate metals from wastewater streams, there are several drawbacks to their use. The metal floc formed is typically fine, requiring the use of coagulants/flocculants and/or filtration to remove the metal complex from the wastewater stream. In addition, these materials are well-known pesticides, fungicides and slimicides, and care must be taken that overdosing does not result in a high level of residual organic dithiocarbamate in the effluent.

M. Okawara, et al., *Bull, Tokyo Inst. Technol.* 78, 1 (1966), CAS (68:78,731n) reported the reaction of PEI with carbon disulfide in the presence of base to yield polymer containing the dithiocarbamate functionality.

J. H. Barnes, et al., *Die Makromolekulare Chemie* 177, 307–310 (1976), (CAS 84:74,833e) describes the preparation and use of the dithiocarbamate derivative of PEI as a metal complexing polymer. It was noted that the polymer as prepared was insoluble in water, but dissolved in alkali at pH's greater than 10. The maximum mole percent functionalization achievable was 37% based on the nitrogen content of the PEI.

K. J. Ivin, et al., *Macromol. Chem.* 179, 591–599 (1978), (CAS 88:137, 137m) describes the preparation of the dithiocarbamate analog of PEI derived by the dimethyl sulfate-initiated polymerization of 2-oxazoline, followed by base hydrolysis of the poly[N-formyliminoethylene] intermediate. PEI synthesized by this process is characterized as being linear.

U.S. Pat. Nos. 4,670,160 and 4,670,180 disclose the functionalization of reaction products of polyamines, including PEI, and epichlorohydrin with carbon disulfide to yield dithiocarbamates containing metal scavenger compounds. Combined use of the metal scavenging compound with at least one sodium monosulfide, sodium polysulfide, and sodium hydrogen sulfide resulted in a synergistic effect in the precipitation of heavy metals from a wastewater. Both patents disclose that when the metal scavenger has a crosslinked structure, it forms either dispersion or suspension upon its mixing with water.

U.S. Pat. No. 4,731,187 discloses a synergistic combination of a metal scavenging compound with at least one sodium monosulfide, sodium polysulfide, and sodium hydrogen sulfide for use in the precipitation of heavy metals from a wastewater. It is taught in Examples 9 and 15 that the metal scavenger can be prepared by functionalization of polyethylenimine with carbon disulfide to yield a polymeric dithiocarbamate. In each case, however, the resulting polydithiocarbamate was water insoluble.

Japan Pat. No. 82/207,591 and Eur. Pat. Appl. EP 433,580 (CAS 8:185066r and 115:119,534k, respectively) describe the synergistic use of PEI dithiocarbamates in conjunction with inorganic sulfides and organic thiocarbamates as heavy metal precipitants for wastewater applications.

U.S. Pat. No. 5,164,095 discloses the functionalization of ethylene dichloride/ammonia polymers with carbon disulfide to yield water soluble polydithiocarbamates effective as heavy metal precipitants in treating wastewater. It is also taught that as the molecular weight of the polyamine increases, the amount of carbon disulfide which can be reacted to form a water soluble product decreases. Based on the claims, the upper molecular weight is limited to 100,000, and the degree of functionalization is limited to 5 to 50 mole percent carbon disulfide.

The aforementioned prior art polydithiocarbamates are typically limited in their water solubility and/or their degree of functionalization with carbon disulfide.

Thus it is an object of the instant invention to provide water soluble, branched polydithiocarbamic acid salts having molecular weights of less than 100,000 and greater than 50 mole percent functionalization with carbon disulfide. It is also an object of the instant invention to provide water soluble, branched polydithiocarbamic acid salts having molecular weights greater than 100,000 which are not limited to a degree of functionalization with carbon disulfide.

It is also an object of the instant invention to provide branched, water soluble polydithiocarbamic acid salts which are effective scavengers of contaminants from aqueous solutions.

SUMMARY OF THE INVENTION

To achieve the foregoing and other objects, the present invention is a composition and a method of using the composition to precipitate contaminants from an aqueous solution. The composition is a water soluble branched polydithiocarbamic acid salt having the formula:

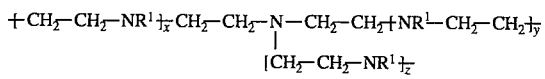

wherein $R^1$ independently is —H or —$CS_2R^2$, $R^2$ independently is H or a cation and the sum of x, y and z is an integer greater than 15 and wherein either the molecular weight of the polydithiocarbamic acid salt is less than 100,000 and more than 50 mole percent of $R^1$ are -$CS_2R^2$ or the molecular weight of the polydithiocarbamic acid salt is greater than 100,000.

The method of using the composition to precipitate contaminants from an aqueous solution comprises adding to the aqueous solution an amount of the composition effective for the purpose of a complexing composition. The complexing composition comprising the water soluble branched dithiocarbamic acid salt complexes with the contaminants in the aqueous solution and precipitates out of the aqueous solution thereby removing contaminants from the aqueous solution.

BRIEF DESCRIPTION OF THE DRAWINGS

The accompanying drawing, which is incorporated in and forms a part of the specification, illustrates the embodiments of the present invention and together with the description, serves to explain the principles of the invention. In the drawing.

DETAILED DESCRIPTION OF THE PREFERRED EMBODIMENTS

Figure 1:
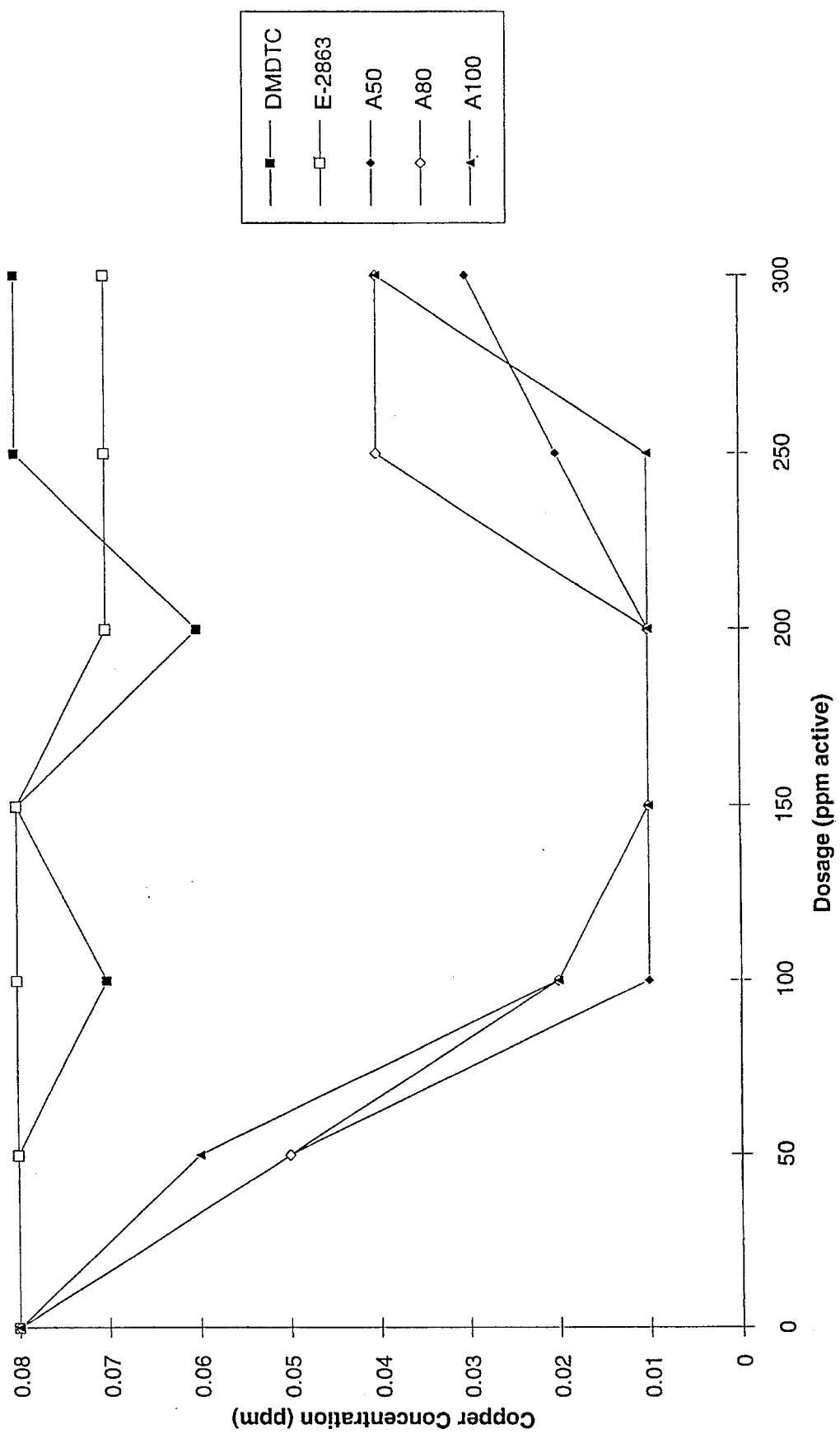
FIG. 1 is a plot of copper concentration versus dosage of metal complexing agent in cooling tower blowdown water.

The present invention provides water soluble compositions and a method for using the compositions for precipitating metal contaminants from aqueous solutions.

The branched water soluble compositions of this invention are formed by reacting poly[ethylenimine] (PEI) with carbon disulfide in the presence of base to yield water-soluble, branched, polymeric dithiocarbamic acid salts represented by the following general formula:

Formula I

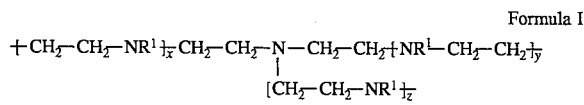

$R^1$ independently represents —H or —$CS_2R^2$ which may be the same or different for each representation; $R^2$ each independently represents H or a cation; and the sum of x, y and z is an integer greater than 15 and wherein either the molecular weight of the polydithiocarbamic acid salt is less than 100,000 and more than 50 mole percent of $R^1$ are —$CS_2R^2$, or the molecular weight of the polydithiocarbamic acid salt is greater than 100,000. At molecular weights greater than 100,000 the degree of functionalization of $R^1$ is not limited.

In a preferred embodiment of the invention >50 mole percent of $R^1$ are —$CS_2R^2$, $R^2$ is an alkali metal, and the sum of x, y and z is an integer greater than 100.

In a particularly preferred embodiment of the invention >80 mole percent of $R^1$ are —$CS_2R^2$, $R^2$ is an alkali metal, and the sum of x, y and z is an integer greater than 500.

The PEI of this invention is prepared by the ring opening polymerization of aziridine. PEI prepared by this method is commercially available from BASF Corporation under the trade name POLYMIN® and is referenced by the general Chemical Abstract Services (CAS) registry number of [9002-98-6]. It is also considered part of this invention that PEIs prepared by the homopolymerization of aziridine and capped with ethylenediamine, CAS [25987-06-8], or crosslinked with 1,2-dichloroethane, CAS [68130-97-2], can be utilized in the synthesis of the polydithiocarbamate salts of the present invention. The resulting PEIs prepared by these methods are characterized as branch polymers represented by the following formula Formula II

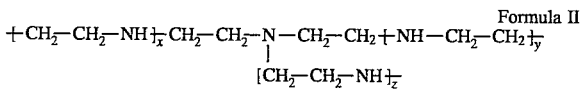

Methods for the reaction of amines with carbon disulfide to prepare dithiocarbamic acid salts are well known and are detailed in U.S. Pat. Nos. 2,609,389, 2,693,485 and 5,013,451.

It may also be observed that the molecular weight of the polydithiocarbamic acid salt may be less than the initial starting polyamine precursor due to side reactions. This degradation is acceptable as long as the molecular weight of the resulting product (sum of x, y and z of Formula I) is greater than 15. The reaction conditions utilized for the dithiocarbonylation of the polyamine precursor can also be modified by methods known to those skilled in the art to minimize degradation of the polymer.

It will be appreciated that by-products (for example inorganic salts) are coproduced along with the compounds of the present invention in the course of the above reaction scheme. The desired reaction product can be readily separated from the reaction by-products by known methods. However, it is feasible and economical to employ the present compounds as produced without separation or purification.

The compounds of the present invention should be added to the aqueous system for which precipitation of metal contaminants such as transition metals, post-transition metals, lanthanides, actinides, and non-metal contaminants such as arsenic, selenium, and tellurium is desired, in an amount effective for the purpose. This amount will vary depending on the particular system for which treatment is desired and will be influenced mainly by the metal content of the water and the presence of other ligand molecules. Treatment levels of composition in an aqueous solution can be from about 0.1 parts per million (ppm) to about 10,000 ppm, preferably from about 0.1 ppm to about 1,000 ppm and most preferably from about 0.1 ppm to about 500 ppm. The metal polymer complexes formed are self flocculating, quick settling, and readily separated from the wastewater stream.

The compounds of the present invention are also expected to exhibit water clarification activity of aqueous systems which contain an oil-in-water emulsion.

The invention will now be further described with reference to a number of specific examples which are to be regarded solely as illustrative and not restricting the scope of the present invention.

Example I

A suitable reactor vessel was equipped with a mechanical stirrer, thermometer, condenser, nitrogen sparge, caustic scrubber, and addition ports. Aqueous poly[ethylenimine] (50%, CAS [9002-98-6], 44 g, 0.51 mole amine) and 141 ml of deionized water were charged to the vessel and sparged with nitrogen. The polymer solution was cooled with an ice water bath, then aqueous sodium hydroxide (50%, 33 g, 0.41 mole) was charged to the vessel. The nitrogen sparge was then switched to a nitrogen blanket and carbon disulfide (31 g, 0.41 mole) was charged dropwise over a 15 minute period with ice water cooling. After addition, the batch was mixed 1 hour with cooling, then was allowed to gradually warm to room temperature. Any residual carbon disulfide was then removed from the product by sparging with nitrogen. The resulting solution was adjusted to 248.36 g with deionized water to yield a 25% by weight actives product. The viscosity of the solution, referred to as Polymer A80, was 196 centipoise (cps) at 25° C.

A series of polymers were prepared as described in Example I for testing. A summary of these compounds and their properties, referenced to the starting PEIs, is shown in Table I.

TABLE I

PEI Dithiocarbamic Acid Salt Summary

| Polymer | PEI CAS # | Mole % $CS_2$[1] | % Actives | Viscosity[2] | pH[3] | Sum of x,y,z[4] |
|---------|-----------|------------------|-----------|--------------|-------|-----------------|
| PEI A       | [9002-98-6]  | 0   | 26.0 | 297.0 | 12.0 |        |
| Polymer A20 | [9002-98-6]  | 20  | 26.0 | 179.0 | 13.4 |        |
| Polymer A50 | [9002-98-6]  | 50  | 26.5 | 283.0 | 12.3 |        |
| Polymer A80 | [9002-98-6]  | 80  | 25.7 | 196.0 | 13.7 |        |
| Polymer A100| [9002-98-6]  | 100 | 24.3 | 68.0  | 12.6 | 5,800  |
| PEI B       | [68130-97-2] | 0   | 23.6 | 153.0 | 11.6 | 19,000 |
| Polymer B20 | [68130-97-2] | 20  | 24.9 | 87.0  | 11.9 | 10,000 |
| Polymer B50 | [68130-97-2] | 50  | 26.3 | 76.0  | 11.6 | 12,000 |
| Polymer B80 | [68130-97-2] | 80  | 24.5 | 53.0  | 12.9 | 9,000  |
| PEI C       | [9002-98-6]  | 0   | 25.1 | 68.0  | 11.6 |        |
| Polymer C20 | [9002-98-6]  | 20  | 23.7 | 31.0  | 12.5 |        |
| Polymer C50 | [9002-98-6]  | 50  | 24.4 | 34.0  | 12.5 |        |
| Polymer C80 | [9002-98-6]  | 80  | 26.1 | 32.0  | 11.4 | 1,200  |
| PEI D       | [25987-06-8] | 0   | 23.6 | 10.0  | 10.8 |        |
| Polymer D20 | [25987-06-8] | 20  | 24.7 | 7.4   | 11.2 |        |
| Polymer D50 | [25987-06-8] | 50  | 25.9 | 6.6   | 11.0 |        |
| Polymer D80 | [25987-06-8] | 80  | 22.4 | 5.1   | 12.9 | 17     |

[1]Mole % $CS_2$ charged relative to the theoretical moles of amines.
[2]Measured at 25° C. in centipoise.
[3]pH 10.0 buffer.
[4]Sum of x, y and z, as determined by Low Angle Laser Light Scattering (LALLS) analysis.

Example II

The data in Table II demonstrate the metal precipitation capability of Polymer A80 of Example I of the present invention on a synthetic wastewater. In this test 20 ppm active of Polymer A80 was added to a 200 ml aliquot of the synthetic wastewater (pH=9.0) while mixing at 100 rpm. The combination was then mixed for 2 minutes at 100 rpm and 5 minutes at 35 rpm. During the fast mixing stage (100 rpm) small floc were formed as the metal-polymer complexes formed. During the slow mixing stage (35 rpm) the floc grew in size. When the contents of the jars were allowed to settle for 5 minutes, the large heavy floc rapidly settled out of solution. The supernatant was then withdrawn from the mixture, one half of which was filtered through a 5 micron filter. Both the filtered and unfiltered samples were then digested with 5% HCl at 90°–95° C. for four hours before analysis for metal content using inductively coupled plasma atomic emission spectroscopy (ICP-AES). The untreated synthetic wastewater was also analyzed by ICP-AES for reference.

TABLE II

| Metal Species | Untreated (ppm) | 20 ppm Polymer A80 Unfiltered (ppm/% Red.) | | 20 ppm Polymer A80 Filtered (ppm/% Red.) | |
| --- | --- | --- | --- | --- | --- |
| Al | 1.8 | 0.09 | 61% | 0.7 | 61% |
| Sb | 2.2 | 1 | 55% | 1 | 55% |
| As | 2 | 0.7 | 65% | 0.7 | 65% |
| Cd | 1.6 | 0.09 | 94% | 0.03 | 98% |
| Ca, as $CaCO_3$ | 0.05 | 0.05 | 0% | 0.24 | 0% |
| Cr, as $CrO_4$ | 3.81 | 0.2 | 95% | 0.02 | 99% |
| CO | 1.71 | 0.14 | 92% | 0.07 | 96% |
| Cu | 1.79 | 0.33 | 82% | 0.21 | 88% |
| Fe | 0.01 | 0.01 | 0% | 0.006 | 40% |
| Pb | 5.21 | 0.2 | 96% | 0.02 | 100% |
| Mg, as $CaCO_3$ | 7.14 | 5.87 | 18% | 5.67 | 21% |
| Mo, as $MoO_4$ | 2.97 | 2.72 | 8% | 2.65 | 11% |
| Ni | 1.7 | 0.2 | 88% | 0.1 | 94% |
| Se | 2 | 1 | 50% | 1 | 50% |
| Ag | 0.01 | 0.009 | 10% | 0.007 | 30% |
| Sr | 1.72 | 1.31 | 24% | 1.23 | 28% |
| Ti | 1.74 | 0.07 | 96% | 0.01 | 99% |
| V | 1.63 | 0.45 | 72% | 0.4 | 75% |
| Zn | 1.76 | 0.15 | 91% | 0.09 | 95% |
| Tl | 2 | 1 | 50% | 1 | 50% |

The % Reduction in metal concentration was calculated using the following equation:

% Reduction=100 [(ppm untreated− ppm supernatant)/ppm untreated]

The total metal concentration in the untreated water at pH=9 was 43 ppm. Without filtration, the total metal concentration was reduced to 16 ppm with only 20 ppm of Polymer A80 With filtration, even greater removals were obtained for most of the metals. The data in Table II also show that Polymer A80 does not remove significant amounts of the non-toxic metals Ca and Mg. The selectivity of the polymers of this invention for non-alkaline earth and non-alkali metal ions is advantageous because the presence of IA and IIA ions will not increase the dosage needed to precipitate the toxic transition and post transition metal ions.

Example III

The polymers set forth in Table I were evaluated at 2 to 100 ppm actives in the synthetic wastewater described in Example II. These tests were conducted referenced to sodium dimethyldithiocarbamate (DMDTC), commercially available from Vinings Industries under the trade name VINMET®1140, and from ALCO Chemical Corporation under the trade name AQUAMET®M, and a blend of polymeric dithiocarbamate, sodium hydrosulfide, sodium chloride, and disodium ethylenebis(dithiocarbamate), marketed by CYTEC Industries, E-2863. The lowest metal concentrations achieved by each of the treatments for a selected number of contaminants (As, Cd, Cr, Cu, Ni, Pb, Se, and Zn) are shown in Table III for unfiltered samples and in Table IV for filtered samples.

TABLE III

Lowest Metal Concentration Achieved for Supernatant Analyses of Unfiltered Samples

| | As ppm | Cd ppm | Cr ppm | Cu ppm | Ni ppm | Pb ppm | Se ppm | Zn ppm |
| --- | --- | --- | --- | --- | --- | --- | --- | --- |
| Untreated (ave.) | 2.00 | 1.60 | 3.95 | 1.85 | 1.85 | 3.61 | 2.00 | 1.84 |
| DMDTC (ave.) | 0.75 | 0.12 | 0.09 | 0.32 | 0.09 | 0.25 | 0.35 | 0.11 |
| E-2863 (ave.) | 0.67 | 0.15 | 0.34 | 0.29 | 0.20 | 0.40 | 0.05 | 0.18 |
| A50 | 0.50 | 0.06 | 0.10 | 0.30 | 0.10 | 0.04 | 0.70 | 0.14 |
| A80 | 0.50 | 0.11 | 0.26 | 0.46 | 0.20 | 0.10 | 0.70 | 0.17 |
| A100 | 0.60 | 0.11 | 0.23 | 0.45 | 0.20 | 0.09 | 0.80 | 0.19 |
| B | 1.00 | 1.02 | 2.43 | 0.94 | 1.10 | 2.20 | 2.00 | 0.76 |
| B20 | 0.80 | 0.20 | 0.26 | 0.46 | 0.20 | 0.44 | 0.08 | 0.30 |
| B50 | 0.70 | 0.10 | 0.20 | 0.22 | 0.20 | 0.20 | 0.05 | 0.13 |
| B80 | 0.70 | 0.11 | 0.21 | 0.32 | 0.20 | 0.30 | 0.05 | 0.17 |
| C | 1.00 | 1.16 | 2.77 | 1.33 | 1.20 | 3.80 | 2.00 | 1.29 |
| C20 | 0.60 | 0.19 | 0.23 | 0.43 | 0.10 | 0.44 | 0.05 | 0.28 |
| C50 | 0.60 | 0.07 | 0.09 | 0.18 | 0.08 | 0.10 | 0.05 | 0.10 |
| C80 | 0.60 | 0.09 | 0.10 | 0.37 | 0.10 | 0.20 | 0.05 | 0.12 |
| D | 1.00 | 1.07 | 2.32 | 1.19 | 1.10 | 3.30 | 1.00 | 1.20 |
| D20 | 0.70 | 0.26 | 0.37 | 0.38 | 0.20 | 0.60 | 0.20 | 0.55 |
| D50 | 0.60 | 0.09 | 0.20 | 0.24 | 0.10 | 0.20 | 0.05 | 0.12 |
| D80 | 0.60 | 0.07 | 0.10 | 0.25 | 0.07 | 0.10 | 0.05 | 0.09 |

TABLE IV

Lowest Metal Concentration Achieved for Supernatant Analyses of Filtered Samples (5 micron filter)

| | As ppm | Cd ppm | Cr ppm | Cu ppm | Ni ppm | Pb ppm | Se ppm | Zn ppm |
| --- | --- | --- | --- | --- | --- | --- | --- | --- |
| Untreated (ave.) | 2.00 | 1.60 | 3.95 | 1.85 | 1.85 | 3.61 | 2.00 | 1.84 |
| DMDTC (ave.) | 0.65 | 0.075 | <0.03 | <0.01 | <0.04 | <0.04 | 0.35 | 0.05 |
| E-2863 (ave.) | 0.50 | 0.107 | <0.03 | 0.02 | 0.03 | <0.04 | 0.08 | 0.04 |
| A50 | 0.30 | 0.006 | <0.03 | 0.03 | <0.03 | <0.04 | 0.90 | 0.03 |
| A80 | 0.30 | 0.005 | <0.03 | 0.01 | <0.03 | <0.04 | 0.90 | 0.03 |
| A100 | 0.30 | 0.005 | <0.03 | <0.01 | <0.03 | <0.04 | 1.00 | 0.03 |
| B | 0.60 | 0.040 | 0.06 | 0.22 | 0.08 | 0.09 | 1.00 | 0.06 |
| B20 | 0.70 | 0.040 | <0.03 | 0.10 | 0.05 | 0.06 | 0.20 | 0.10 |
| B50 | 0.60 | 0.030 | <0.03 | 0.02 | 0.07 | 0.04 | 0.06 | 0.06 |
| B80 | 0.60 | 0.020 | <0.03 | 0.02 | 0.04 | 0.04 | 0.06 | 0.07 |
| C | 0.50 | 0.030 | <0.03 | 0.15 | 0.04 | 0.04 | 1.00 | 0.04 |
| C20 | 0.50 | 0.020 | <0.03 | 0.06 | <0.03 | <0.04 | 0.70 | 0.06 |
| C50 | 0.50 | 0.008 | <0.03 | 0.01 | <0.03 | <0.04 | 0.05 | 0.04 |
| C80 | 0.60 | 0.010 | <0.03 | 0.08 | <0.03 | <0.04 | 0.05 | 0.05 |

TABLE IV-continued

Lowest Metal Concentration Achieved for
Supernatant Analyses of Filtered Samples
(5 micron filter)

|     | As ppm | Cd ppm | Cr ppm | Cu ppm | Ni ppm | Pb ppm | Se ppm | Zn ppm |
| --- | --- | --- | --- | --- | --- | --- | --- | --- |
| D   | 0.60 | 0.180 | 0.10 | 0.38 | 0.10 | 0.30 | 1.00 | 0.22 |
| D20 | 0.60 | 1.110 | 0.03 | 0.12 | 0.07 | 0.10 | 0.09 | 0.30 |
| D50 | 0.50 | 0.007 | <0.03 | 0.01 | <0.03 | <0.04 | 0.05 | 0.04 |
| D80 | 0.60 | 0.007 | <0.03 | 0.02 | <0.03 | <0.04 | 0.05 | 0.06 |

The data in Tables III and IV show that metal ions such as Cd, Cr, Cu, Ni, Pb, and Zn, and non-metal ions such as As and Se, are removed by the water-soluble polymeric dithiocarbamic acid salts described in this invention. For most of the treatments, the floc formed by the polymers of this invention were large and settled faster than those formed with DMDTC and E-2863.

Example IV

Three of the examples set forth in Table I were evaluated in a sample of cooling tower blowdown containing metal ions and typical cooling tower treatment chemicals. The tests were conducted utilizing the procedure described in Example II with varying dosages and a pH of 8.5. The unfiltered copper removal efficiencies of the compounds of the present invention compared to CYTEC E-2863 and DMDTC are shown in FIG. 1.

As shown in FIG. 1 the compounds of the present invention are effective in precipitating metals from cooling tower blowdown, and are more effective than the commercially available materials tested in this example.

Example V

The examples as set forth in Table I were evaluated in a sample of municipal wastewater containing low concentrations of metal ions. The tests were conducted as described in Example II utilizing 1 to 4 ppm actives contaminant precipitant, 50 ppm alum, and 1 ppm of an anionic acrylic acid/acrylamide copolymer flocculant. The pH of the wastewater was 7.5. The unfiltered chromium, copper and zinc removal efficiencies of the compounds of the present invention compared to CYTEC E-2863 and DMDTC are shown in Table V.

TABLE V

MUNICIPAL WASTEWATER - LOWEST METAL
CONCENTRATION ACHIEVED
SUPERNATANT ANALYSIS - UNFILTERED

|     | Cr (ppm) | Cu (ppm) | Zn (ppm) |
| --- | --- | --- | --- |
| Untreated | 0.062 | 0.207 | 0.189 |
| DMDTC (ave.) | 0.009 | 0.009 | 0.043 |
| E-2863 (ave.) | 0.011 | 0.008 | 0.034 |
| A50 | 0.010 | 0.005 | 0.031 |
| A80 | 0.010 | 0.006 | 0.033 |
| A100 | 0.012 | 0.006 | 0.032 |
| B50 | 0.012 | 0.006 | 0.035 |
| B80 | 0.010 | 0.007 | 0.039 |
| C50 | 0.009 | 0.007 | 0.032 |
| C80 | 0.013 | 0.007 | 0.029 |
| D50 | 0.011 | 0.006 | 0.029 |
| D80 | 0.012 | 0.007 | 0.051 |

It can be seen from these values that the compounds of the present invention are effective in precipitating metals from municipal wastewater, and may be used in combination with coagulants and flocculants.

Example VI

A number of polymers set forth in Table I were evaluated in screen bioassays for aquatic toxicity under varying dosages. The results of this testing demonstrated that the materials of the present invention functionalized with greater than 20 mole percent carbon disulfide are generally less toxic to the species in the study than the prior art dithiocarbamate compounds DMDTC and E-2863, and unfunctionalized PEI. A summary of this testing is shown in Table VI.

TABLE VI

AQUATIC TOXICITY STUDY
CUMULATIVE % MORTALITY

| Compound | ppm Actives | Fathead Minnow 48 hr | Fathead Minnow 96 hr | Daphnia magna 24 hr | Daphnia magna 48 hr |
| --- | --- | --- | --- | --- | --- |
| DMDTC | 0.04 | 100[1] | — | 0 | 85 |
|  | 0.20 | — | — | 50 | 100 |
|  | 0.40 | 100[1] | — | 100 | 100 |
|  | 2.0 | — | — | 100 | 100 |
|  | 4.0 | 100[1] | — | 100 | 100 |
|  | 20.0 | 100[1] | — | — | — |
|  | 40.0 | 100[1] | — | — | — |
| E-2836 | 0.029 | 0[1] | 0[1] | 0 | 0 |
|  | 0.29 | 0[1] | 0[1] | 0 | 0 |
|  | 2.90 | 40[1] | 40[1] | 0 | 0 |
|  | 7.25 | — | — | 80 | 95 |
|  | 14.5 | 100[1] | 100[1] | 100 | 100 |
|  | 29.0 | 100[1] | 100[1] | — | — |
| Polymer A80 | 0.25 | 0 | 0 | 0 | 0 |
|  | 2.50 | 0 | 0 | 0 | 0 |
|  | 12.5 | 0 | 0 | 0 | 0 |
|  | 25.0 | 0 | 0 | 0 | 5 |
|  | 62.5 | 0 | 15 | 0 | 45 |
|  | 125.0 | 0 | 20 | 30 | 100 |
| Polymer B20 | 0.25 | 0 | 0 | 0 | 0 |
|  | 2.50 | 100 | 100 | 0 | 0 |
|  | 12.5 | 100 | 100 | 5 | 30 |
|  | 25.0 | 100 | 100 | 0 | 50 |
|  | 62.5 | 100 | 100 | 10 | 50 |
|  | 125.0 | 100 | 100 | 65 | 95 |
| Polymer B50 | 0.25 | 0 | 0 | 0 | 0 |
|  | 2.50 | 0 | 0 | 0 | 0 |
|  | 12.5 | 0 | 0 | 0 | 0 |
|  | 25.0 | 0 | 0 | 0 | 0 |
|  | 62.5 | 0 | 30 | 0 | 30 |
|  | 125.0 | 0 | 45 | 0 | 95 |
| Polymer B80 | 0.25 | 0 | 0 | 0 | b |
|  | 2.50 | 0 | 0 | 0 | 0 |
|  | 12.5 | 0 | 0 | 0 | 0 |
|  | 25.0 | 0 | 10 | 0 | 15 |

TABLE VI-continued

AQUATIC TOXICITY STUDY
CUMULATIVE % MORTALITY

| Compound | ppm Actives | Fathead Minnow 48 hr | Fathead Minnow 96 hr | Daphnia magna 24 hr | Daphnia magna 48 hr |
|---|---|---|---|---|---|
| | 62.5 | 15 | 30 | 0 | 45 |
| | 125.0 | 55 | 75 | 40 | 90 |
| Polymer C80 | 0.25 | 0 | 0 | 5 | |
| | 2.50 | 0 | 0 | 0 | 5 |
| | 12.5 | 0 | 5 | 0 | 10 |
| | 25.0 | 30 | 55 | 0 | 5 |
| | 62.5 | 25 | 60 | 0 | 65 |
| | 125.0 | 35 | 50 | 25 | 100 |
| Polymer D80 | 0.25 | — | 0 | 0 | |
| | 2.50 | 0 | 0 | 0 | 0 |
| | 12.5 | 0 | 0 | 0 | 100 |
| | 25.0 | 5 | 5 | 0 | 100 |
| | 62.5 | 10 | 10 | 10 | 100 |
| | 125.0 | 70 | 70 | 30 | 100 |
| PEI B | 0.25 | 5 | 60 | 0 | 0 |
| | 2.50 | 100 | 100 | 0 | 30 |
| | 12.5 | 100 | 100 | 0 | 40 |
| | 25.0 | 100 | 100 | 25 | 55 |
| | 62.5 | 100 | 100 | 30 | 75 |
| | 125.0 | 100 | 100 | 100 | 100 |

[1]24 hour test.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

We claim:

1. A water soluble, branched, polymeric composition for precipitating contaminants from an aqueous solution, said composition comprising a polydithiocarbamic acid salt having the formula:

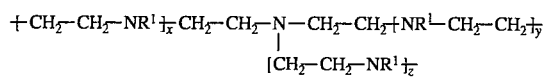

wherein $R^1$ is independently —H or —$CS_2R^2$, $R^2$ is independently H or a cation and the sum of x, y and z is an integer greater than 15 and wherein either the molecular weight of said polydithiocarbamic acid salt is less than 100,000 and more than 50 mole percent of $R^1$ are —$CS_2R^2$, or the molecular weight of said polydithiocarbamic acid salt is greater than 100,000.

2. The composition of claim 1 wherein greater than 50 mole percent of $R^1$ are —$CS_2R^2$, $R^2$ is an alkali metal and the sum of x,y, and z is an integer greater than 100.

3. The composition of claim 1 wherein greater than 80 mole percent of $R^1$ are —$CS_2R^2$, $R^2$ is an alkali metal and the sum of x,y, and z is an integer greater than 500.

4. The composition of claim 1 wherein said composition is effective for precipitating transition metals, post transition metals, lanthanides, and actinides from said aqueous solution.

5. The composition of claim 1 wherein said composition is effective for precipitating arsenic, selenium and tellurium from said aqueous solution.

6. The composition of claim 1 wherein said aqueous solution is cooling tower blowdown or municipal wastewater.

* * * * *